United States Patent
He

(10) Patent No.: US 8,660,260 B1
(45) Date of Patent: Feb. 25, 2014

(54) PROTECTIVE COVER

(71) Applicant: Tao He, Shenzhen (CN)

(72) Inventor: Tao He, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/663,487

(22) Filed: Oct. 30, 2012

(30) Foreign Application Priority Data

Sep. 25, 2012 (CN) .......................... 2012 1 03599788

(51) Int. Cl.
 *H04M 1/00* (2006.01)
 *H04M 1/02* (2006.01)

(52) U.S. Cl.
 CPC .............. *H04M 1/00* (2013.01); *H04M 1/0283* (2013.01)
 USPC ....................................... 379/451; 455/575.8

(58) Field of Classification Search
 USPC ................. 379/441, 446, 449, 451, 454, 455; 455/575.1, 575.8; 361/679.01, 679.3, 361/679.41, 679.56, 679.57; 206/305, 321, 206/701; 403/220, 229, 231, 401–403; D14/203.1, 203–203.7; D3/201, 215, D3/226, 269, 272, 273
 See application file for complete search history.

(56) References Cited

U.S. PATENT DOCUMENTS

| | | | | |
|---|---|---|---|---|
| D609,463 S | * | 2/2010 | Bullen | D3/218 |
| D678,809 S | * | 3/2013 | LeVian | D11/90 |
| D685,356 S | * | 7/2013 | Diebel | D14/250 |
| 2010/0104814 A1 | * | 4/2010 | Richardson et al. | 428/156 |
| 2011/0192743 A1 | * | 8/2011 | May et al. | 206/320 |
| 2011/0309728 A1 | * | 12/2011 | Diebel | 312/293.1 |
| 2012/0037524 A1 | * | 2/2012 | Lonsdale et al. | 206/320 |
| 2012/0043234 A1 | * | 2/2012 | Westrup | 206/320 |
| 2012/0043247 A1 | * | 2/2012 | Westrup | 206/472 |
| 2012/0188743 A1 | * | 7/2012 | Wilson et al. | 361/816 |

\* cited by examiner

*Primary Examiner* — Tuan D Nguyen

(74) *Attorney, Agent, or Firm* — Altis Law Group, Inc.

(57) ABSTRACT

A protective cover for protecting a panel-shaped electronic device is illustrated. The protective cover includes a polygonal frame and a number of resilient members. The frame is made of soft material and configured for surrounding and retaining the electronic device therein. The frame includes a number of corners. The resilient members entirely are received in the respective corners. Each resilient member includes a hub body and at least three distinctly oriented resilient portions extending from the hub body.

7 Claims, 4 Drawing Sheets

PROTECTIVE COVER

BACKGROUND

1. Technical Field

This invention relates to a protective cover for accommodating a panel-shaped electronic device.

2. Description of Related Art

A variety of protective covers for panel-shaped electronic devices, such as smart phones, are used for protecting the electronic devices. Although conventional protective covers satisfy basic requirements, a new type of protective cover is still desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
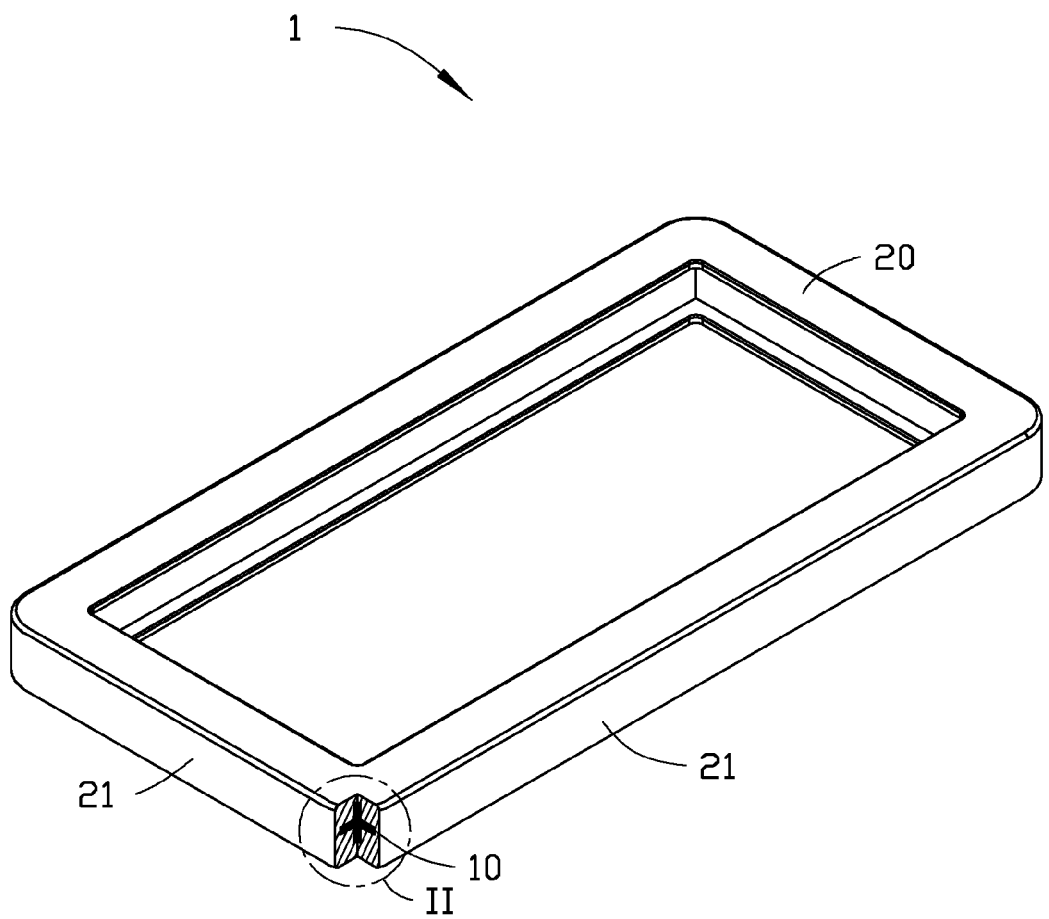
FIG. 1 is an isometric view of a protective cover having a cutting portion II in accordance to an exemplary embodiment.

Referring to FIG. 1, a protective cover 1 according to an exemplary embodiment is illustrated. The protective cover 1 includes a polygonal frame 20 and four resilient members 10 received in the frame 20. The frame 20 is made of soft material, such as rubber, and is configured for surrounding and retaining the electronic device therein a panel-shaped electronic device (not shown). In the embodiment, the frame 20 includes two adjacent perpendicular sides 21 and four corners 22.

Figure 2:
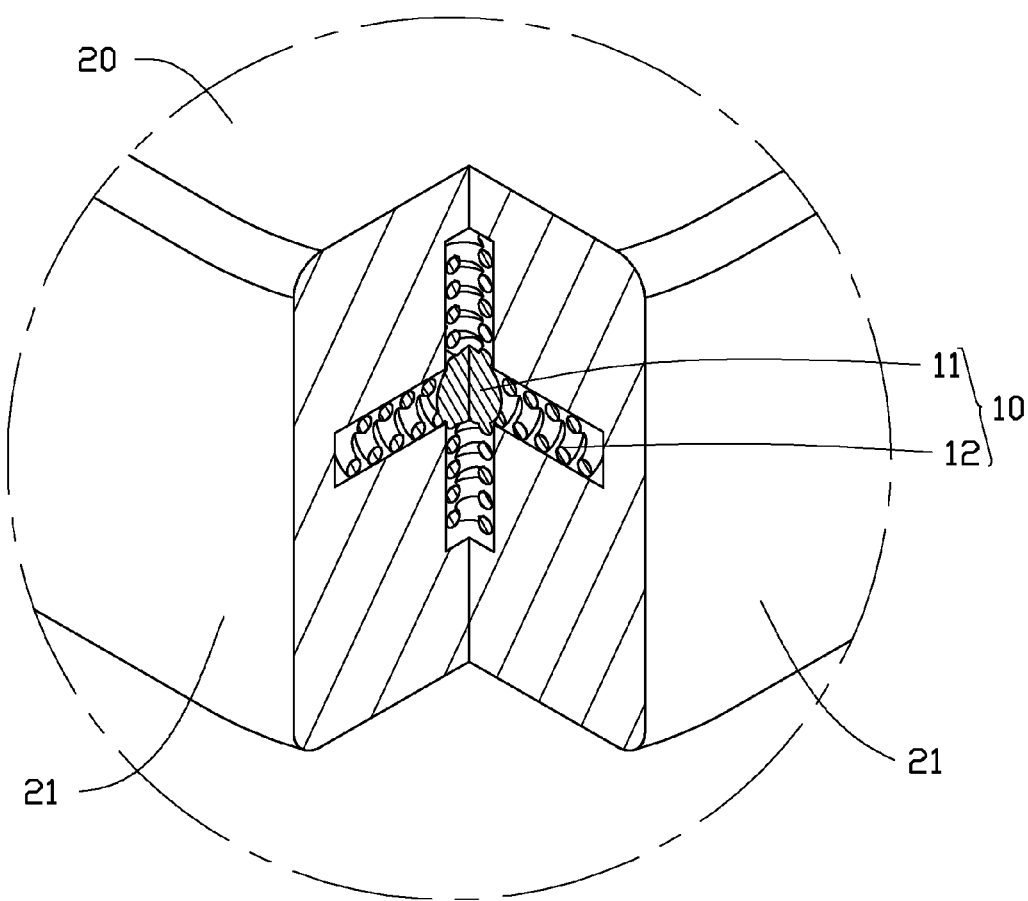
FIG. 2 is an enlarged view of the cutting portion II of FIG. 1.
Figure 3:
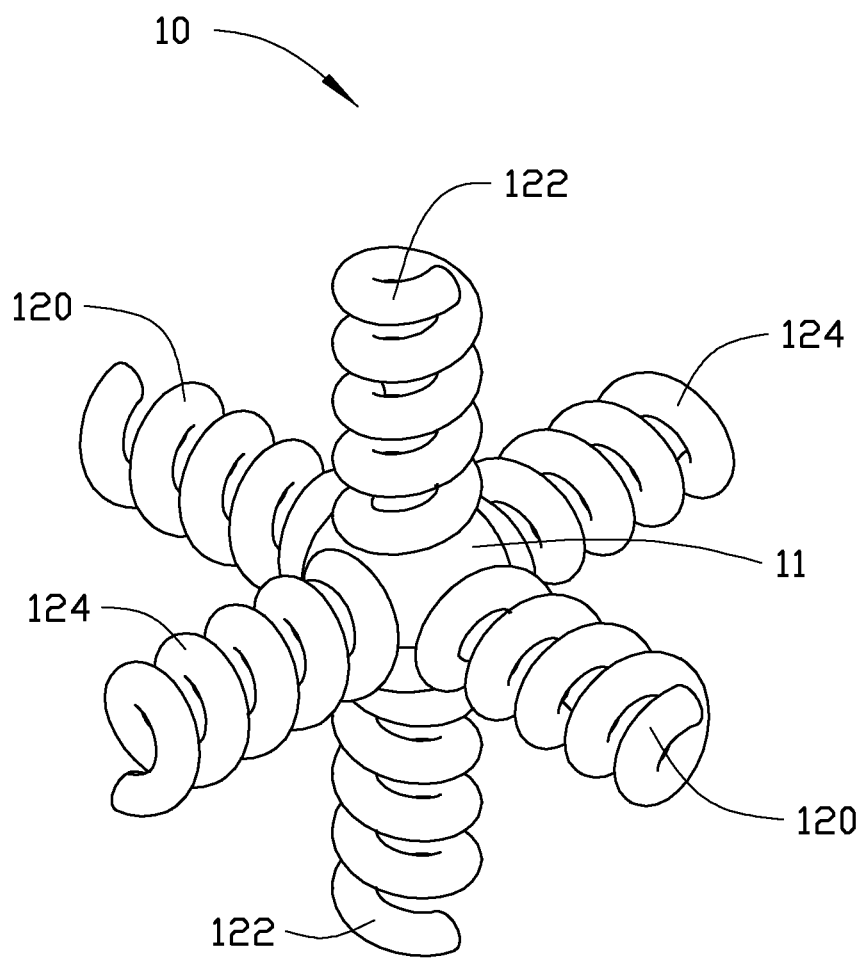
FIG. 3 shows a resilient member of the protective cover in accordance to a first embodiment.
Figure 4:
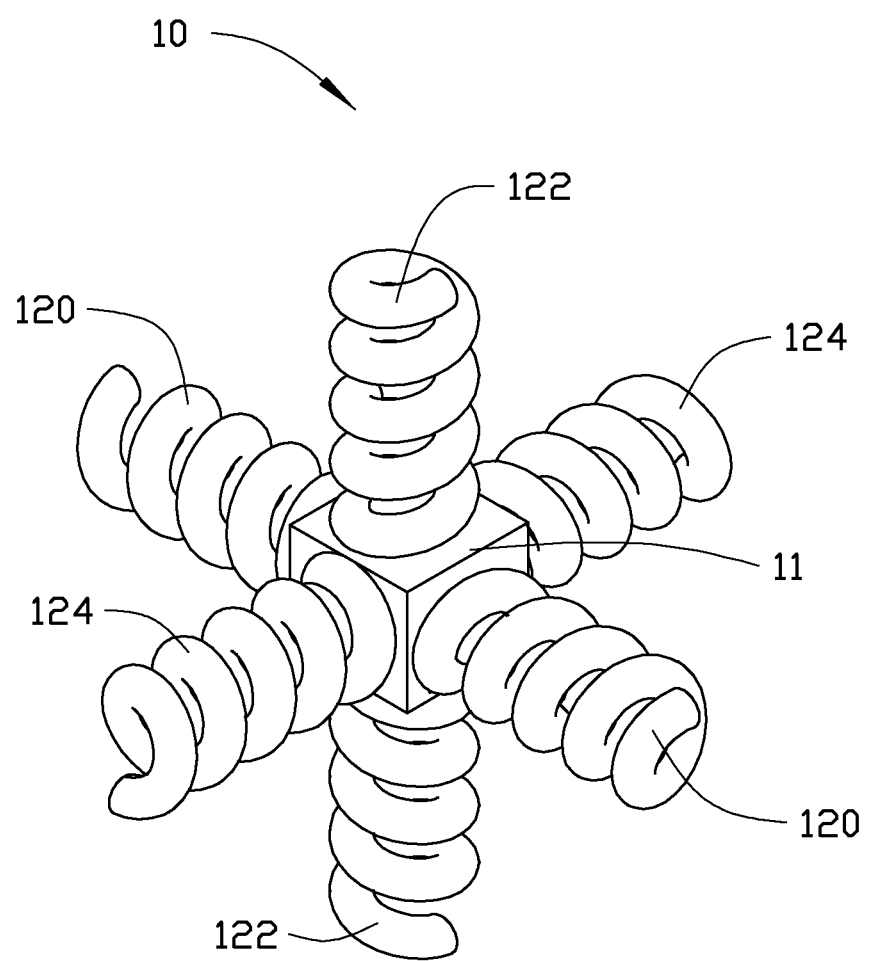
FIG. 4 shows a resilient member of the protective cover in accordance to a second embodiment.

Referring also to FIGS. 2-4, each resilient member 10 is received in one of the four corners 22. Each resilient member 10 includes a hub body 11 and six resilient portions 12 extending from the hub body 11. In the embodiment, the resilient portions 12 are spring coils. The six resilient portions 12 include two first resilient portions 120 from opposite sides of the hub body 11 along a first axis, two second resilient portions 122 from opposite sides of the hub body 11 along a second axis, and two third resilient portions 124 from opposite sides of the hub body 11 along a third axis. In the embodiment, the first axis, the second axis, and the third axis are substantially perpendicular to each other. The first axis and the second axis are respectively perpendicular to the adjacent sides 21. As shown in FIGS. 3-4, the hub body 11 may be spherical or cubical.

When the protective cover 1 accommodating the electronic device falls on the floor, one of the corners 22 of the protective cover 1 often contacts the floor first. The resilient member 10 in the corner 22 can then absorb some of the shock due to falling on the floor, thereby lowering the possibility of damaging the electronic device.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A protective cover for protecting a panel-shaped electronic device, comprising:
    a polygonal frame made of soft material, the frame configured for surrounding and retaining the electronic device therein, the frame comprising a plurality of corners; and
    a plurality of resilient members entirely received in the respective corners, and each resilient member comprising a hub body and at least three distinctly oriented resilient portions extending from the hub body.

2. The protective cover as described in claim 1, wherein the frame is rectangular and comprises four corners, and the plurality of resilient members are four resilient members.

3. The protective cover as described in claim 2, wherein the plurality of resilient members comprise two first resilient portions extending from opposite sides of the hub body along a first axis, two second resilient portions extending from opposite sides of the hub body along a second axis, and two third resilient portions extending from opposite sides of the hub body along a third axis, and the first axis, the second axis, and the third axis perpendicular to each other.

4. The protective cover as described in claim 3, wherein the frame comprises two adjacent perpendicular sides, and the first axis and the second axis are respectively perpendicular to the adjacent sides.

5. The protective cover as described in claim 1, wherein the at least three resilient portion are at least three spring coils.

6. The protective cover as described in claim 1, wherein the hub body is spherical.

7. The protective cover as described in claim 1, wherein the hub body is cubical.

* * * * *